Oct. 23, 1962 J. W. HORNER 3,059,424
ROCKET ENGINE
Filed July 16, 1959 2 Sheets-Sheet 1
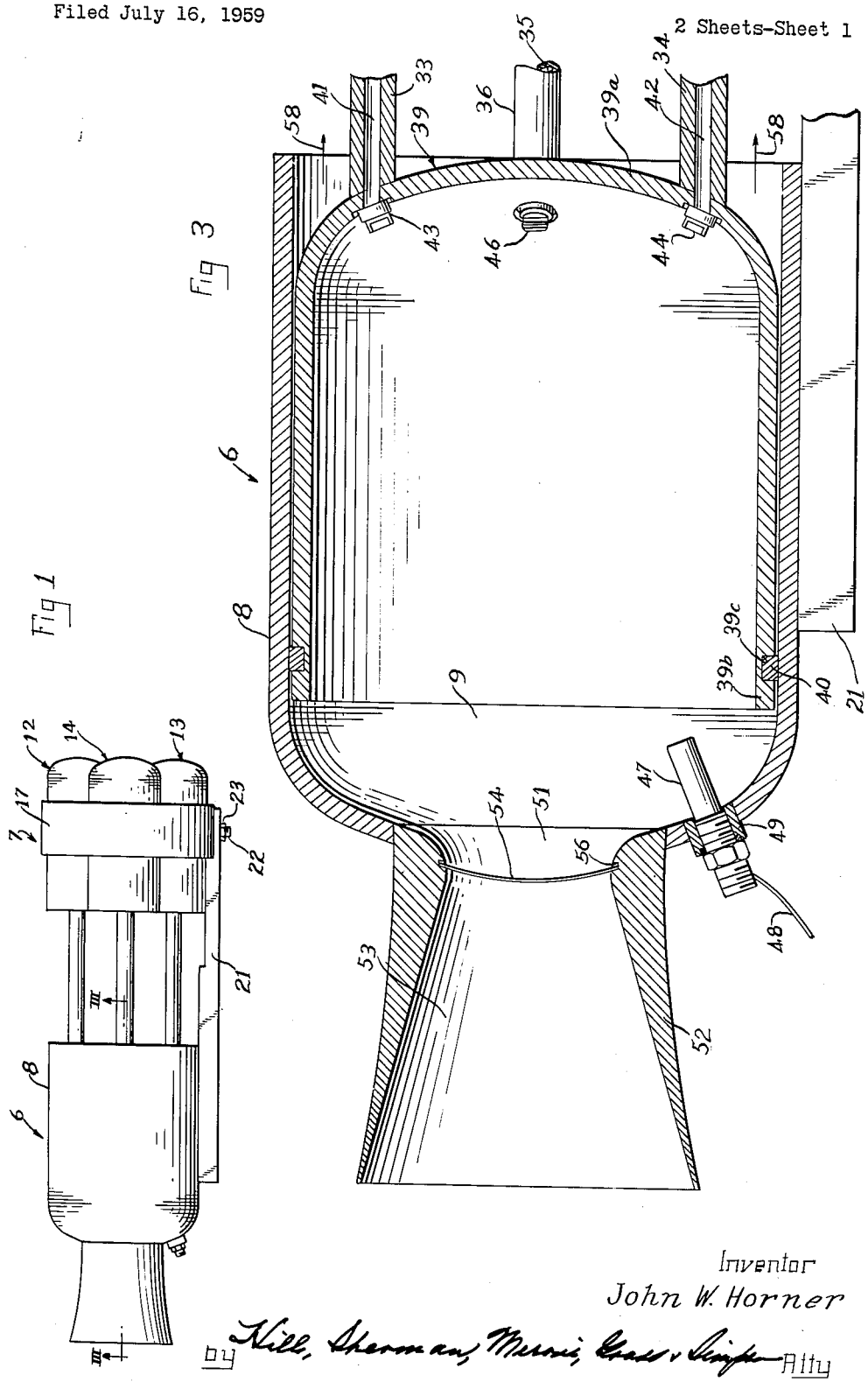
Inventor
John W. Horner

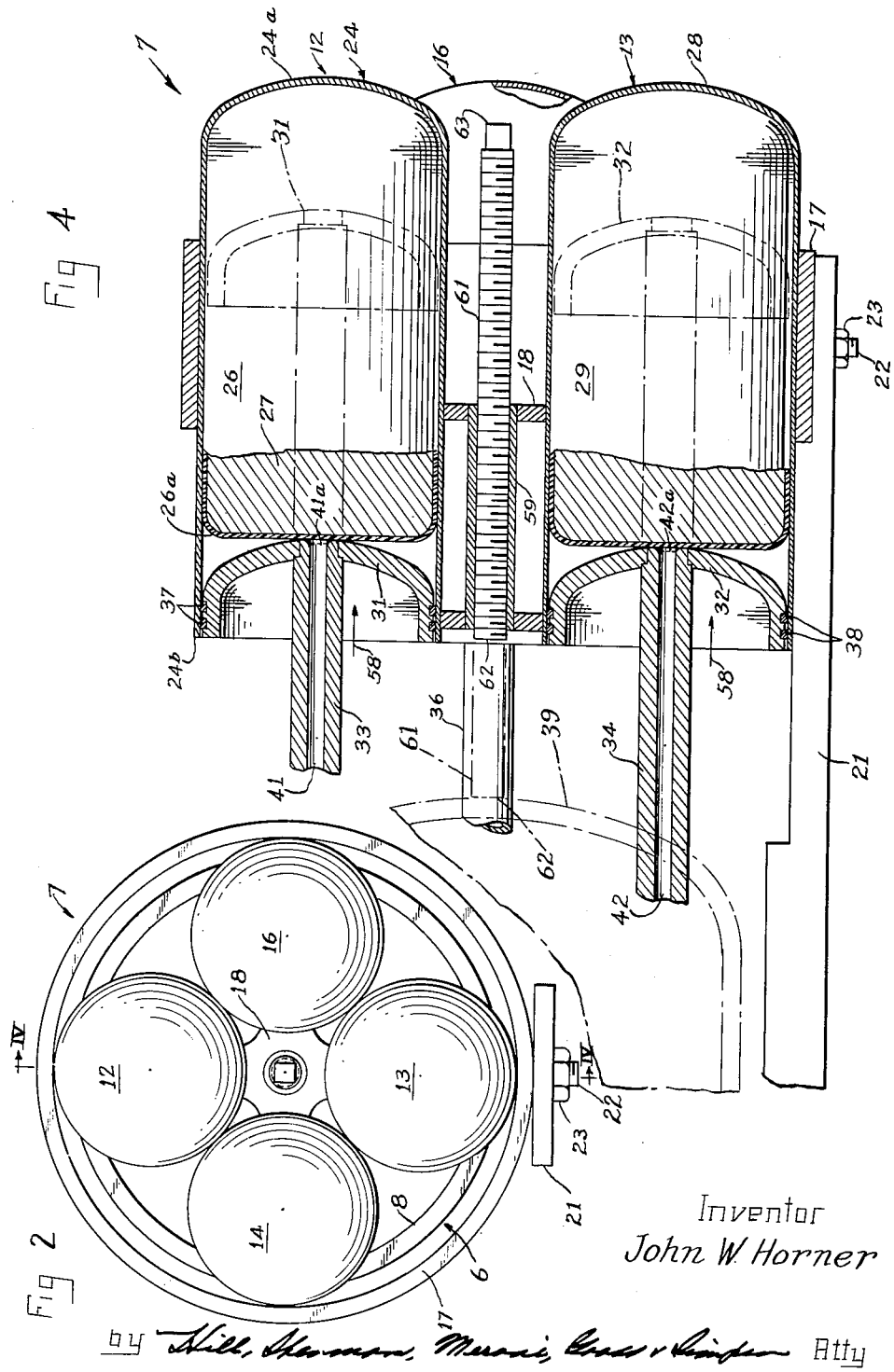

United States Patent Office 3,059,424
Patented Oct. 23, 1962

3,059,424
ROCKET ENGINE
John W. Horner, Whittier, Calif., assignor to Thompson Ramo Wooldridge Inc., Cleveland, Ohio, a corporation of Ohio
Filed July 16, 1959, Ser. No. 827,496
2 Claims. (Cl. 60—35.6)

The present invention relates to improvements in rocket engines. More particularly the invention relates to special application rocket engines of relatively short duration flights wherein high thrusts are available and where the duration of operation may be adjustably controlled.

The invention contemplates the provision of a thrust chamber in which a rocket propellant is burned, having a rearwardly opening jet nozzle with a rupturable blowout nozzle disk thereacross. Ahead of the thrust chamber, removably mounted on an interconnecting frame supporting the thrust chamber, are fuel and oxidizer tanks containing rupturable plastic bags of fuel and oxidizer. A suitable oxidizer is liquid red fuming nitric acid and a suitable fuel is liquid hydrazine which react hypergolically to give a high specific impulse and stable easily controlled burning. Such liquid oxidizers and fuels have very low freezing points. However, it should be understood that many other flowable fuels and oxidizers can be used and this invention is not limited for use with a specific combination of fuels and oxidizers. Fuel and oxidizer delivery pistons are positioned against the rupturable bags in the tanks and are driven into the tanks by hollow piston rods which are connected to a cup-shaped operating piston slidably mounted in the thrust chamber, with fuel and oxidizer flow passages, formed by the hollow piston rods, opening through the operating piston forwardly to carry fuel and oxidizer back into the thrust chamber and the blowout disk will rupture at the start of normal operation. An adjustable stop controls the movement of the operating piston.

A feature of the rocket engine of this invention is the elimination of heretofore required pumps or pressurized fuel and oxidizer containers to feed the thrust chamber.

An object of the present invention is to provide an improved rocket engine in accordance with the above construction which is of a simplified compact nature and is relatively inexpensive to manufacture and assemble.

Another object of the invention is to provide an improved rocket engine which eliminates the need for pumping mechanisms or pressure bottles and valves and other apparatus and eliminates the expense and unreliability caused by these devices.

Another object of the invention is to provide an improved rocket engine which is started by energizing a starting squib or igniter and wherein the energy of the starting squib is utilized to deliver the propellants into the thrust chamber.

A further object of the invention is to provide an improved rocket engine assembly which is adapted for easy handling and compact and simple storage and wherein the fuel and oxidizer can be easily loaded and stored with the engine before use.

Another object of the invention is to provide an improved and simplified rocket engine assembly for relatively short operation provided with simplified and improved mechanism for controlling the duration of engine operation for rocket flight.

Other objects and advantages will become more apparent with the teaching of the principles of the invention in connection with the disclosure of preferred embodiment thereof in the specification, claims and drawings, in which:

FIGURE 1 is a side elevational view of a rocket engine assembly in accordance with the principles of the present invention;

FIGURE 2 is an end elevational view of FIGURE 1 taken from the tank end of the assembly;

FIGURE 3 is a detailed sectional view taken substantially along line III—III of FIGURE 1 and illustrating one end only of the assembly to show the construction of the thrust chamber; and FIGURE 4 is a sectional view taken substantially along line IV—IV of FIGURE 2 and illustrating the other end of the assembly to show the construction of the propellant tanks.

As shown on the drawings:

A rocket engine assembly embodying the principles of the invention is illustrated having a thrust chamber section 6 at the rearward end and a propellant tank section 7 at the forward end. At the thrust chamber end is a hollow cylindrical shell 8 defining a thrust chamber 9 therein, FIGURE 3. At the propellant tank end 7 are a plurality of propellant tanks 12, 13, 14 and 16, with tanks 12 and 13 designated for containing an oxidizer and tanks 14 and 16 designated for containing a fuel. The thrust chamber 9 is adapted for burning various known rocket fuels and is well adapted to such fuel as mixed hydrazines with red fuming nitric acid for the oxidizer. The oxidizer and fuel together constitute the propellant and, for the sake of convenience of description, any material delivered to the thrust chamber can be generally termed fuel and the words propellant and fuel can be used interchangeably.

The tanks 12, 13, 14 and 16, FIGURES 2 and 4, are secured to each other by suitable means such as a spider hub 18 and are also rigidly held in position such as by an annular band 17 which extends around the outside of the tanks. The spider 18 and band 17 may be suitably connected to the tanks as by welding. The tanks which are mounted as a unit are rigidly secured to the thrust chamber shell 8 by an interconnecting frame member 21. The frame member may be suitably attached to the thrust chamber shell such as by welding and is illustrated as removably connected to the tank assembly by a bolt 22 extending radially from the band 17 into a hole in the frame 21 and held on the frame 21 by a nut 23 threaded on the bolt 22. The tanks are thus removable for loading as will be described.

The tanks are similar in construction and therefore only one need be described in detail. The tank 12 which is used for oxidizer is formed of hollow shell 24 having a closed end 24a and a rearwardly facing open end 24b. The tank is loaded with an oxidizer in a rupturable container 26 such as a bag formed of a rupturable bag material 26a with an oxidizer 27 within the bag. The other oxidizer tank 13 is formed of a similar tank shell 28 with a bag 29 of oxidizer therein and the fuel tanks contain rupturable bags of fuel.

As illustrated in FIGURE 4, slidably mounted within the fuel and oxidizer tanks are fuel delivery pistons, illustrated by pistons 31 and 32 for the tanks 12 and 13. The pistons are connected to piston rods 33 and 34 respectively, and a piston rod illustrated at 36 is connected to a similar piston slidably mounted in the fuel tank 16. The pistons are provided with annular grooves carrying piston ring seals such as 37 and 38 which seal the pistons against the walls of the tanks 12 and 13.

When the pistons are driven forwardly into the tanks, or to the right as illustrated in FIGURE 4, the bags of fuel and oxidizer are ruptured. The pistons are driven by their rods being connected to an operating piston 39 slidably mounted within the thrust chamber 9. The operating piston is hollow and cup-shaped with a closed end 39a and a rearwardly facing open end 39b. The open end is provided with an annular groove 39c which carries a flexible annular piston ring 40 to seal the piston against the inner surface of the thrust chamber shell 8.

The piston rods are suitably secured between the oxidizer delivery pistons 31 and 32 and the operating piston 39 such as by welding. Means forming oxidizer delivery passages are provided by the piston rods, which are hollow and have flow passages 41 and 42 therethrough for the piston rods 33 and 34 respectively. Piston rod 36 is provided with a similar flow passage 35 and the rod provided for a piston for the fuel tank 14 also is provided with a fuel flow passage therethrough. It is of course understood that the cross-sectional area of the operating piston 39 is larger than the combined areas of the fuel delivery pistons in the tanks 14 and 16 and the oxidizer delivery pistons 31 and 32 in the tanks 12 and 13 so as to provide a pressure differential to force the fuel and oxidizer into the thrust chamber 9. The oxidizer passages 41 and 42 have open ends 41a and 42a communicating with the tanks 12 and 13, and connect at their other ends to fuel injector nozzles 43 and 44 for the rods 33 and 34. Fuel passage 35 connects to a fuel injector nozzle 46. The injector nozzles are positioned to direct the oxidizer and fuel into the tank for optimum mixing and burning.

The thrust chamber 9 is provided with a starting squib or igniter 47 which may be electrically operated through wires 48. The thrust chamber shell 8 is provided with a fitting 49 for connecting the igniter 47.

The thrust chamber 9 is provided with a gas discharge flow opening 51 and the opening leads to a nozzle 52 connected to the thrust chamber shell 8. The nozzle has a propellant flow passage 53 and a rupturable nozzle blowout disk 54 is positioned across the passage and is blown out when the engine is operated. The rupturable disk 54 is suitably mounted in the nozzle such as by being seated in a groove 56 within the nozzle.

With operation of the igniter, an initial pressure builds up within the thrust chamber 9 driving the operating piston 39 forwardly as indicated by arrows 58, FIGURE 3, and driving the fuel delivery pistons similarly forwardly as indicated by the arrows 58 in FIGURE 4. This will rupture the fuel bags and oxidizer bags 26 and 29 forcing propellant back to the thrust chamber whereupon it burns and the build up of pressure blows out the disk 54 to start the normal operation of the engine.

The engine will operate until the operating piston 39 drives the propellant delivery pistons to the bottom of their tanks or until this movement is terminated by an adjustable stop. For this purpose, a threaded sleeve 59 is carried by the spider 18 between the tanks, and receives a threaded adjustable stop rod 61. When the operating piston 39 engages the end 62 of the stop rod its movement is terminated thereby stopping the delivery of any more fuel to the thrust chamber 9. The rod 61 has a squared end 63 for receiving a wrench to adjust its position and adjust the travel of the operating piston 39, thereby adjustably controlling the duration of operation of the engine. The broken line positions of FIGURE 4 show the operating piston 39 being stopped by the end 62 of the stop rod for terminating the operation of the engine before the propellant is exhausted, and with the delivery pistons 31 and 32 part way into their tanks.

In operation, the tank section 7 is removed by removing the nut 23 from the bolt 22, and is lifted off the interconnecting frame member 21 so as to withdraw the propellant delivery pistons from the tanks. The bags of fuel and oxidizer, such as the oxidizer bags 26 and 29 are placed in the tanks and the tanks reattached to the frame member 21. The adjustable stop rod 61 is threaded to a position in accordance with the duration of engine operation that is desired. The squib 47 is then fired creating a preliminary pressure in the thrust chamber 9 and this forces the operating piston 39 back causing the delivery pistons such as 31, 32 to rupture the bags and feed fuel and oxidizer to the thrust chamber. The increase in pressure in the thrust chamber due to burning of the fuel blows out the disk 54 and normal operation will ensue with the operating piston being forced back to continually feed the fuel and oxidizer to the thrust chamber during operation, until the operating piston engages the adjustable stop rod 61.

Thus it will be seen that I have provided an improved rocket engine which meets the objectives and advantages hereinbefore set forth. The mechanism is well suited to short duration operation and rocket flights which may be on the order of a maximum flight duration of one and a fraction seconds and the duration is readily and simply controlled. The burning is easily controlled and stable, the specific impulse is high and the reaction is hyperbolic. The mechanism is well adapted for use in varying temperatures and the freeze point of propellants such as mixed hydrazines and red fuming nitric acid are well below −60 F.

The need for appurtenances such as pumping mechanisms or pressure bottles and valves and other devices which add expense and impair reliability has been eliminated. The engine can be in the ready state for long periods and will require no check out before operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A rocket engine comprising a frame member, a motor body on the frame member having an axially extending thrust chamber with a rearwardly facing nozzle, a motor piston slidably mounted in the chamber, a cluster of fuel and oxidizer tanks mounted laterally of each other with cylindrical interiors and having rearwardly facing open ends, fuel and oxidizer pistons slidably mounted in said tanks for being forced axially forwardly to forcibly eject fuel and oxidizer from the tanks and being removably insertable into said open ends, means rigidly connecting said fuel and oxidizer pistons to said motor piston, conduit means leading from said tanks to said thrust chamber, and means removably securing said cluster of tanks on said frame member so that the tanks can be removed and moved axially forwardly with respect to the motor body to slide the fuel and oxidizer pistons from the tanks for loading the tanks.

2. A rocket engine comprising a frame member, a motor body on the frame member having an axially extending thrust chamber with a rearwardly facing nozzle, a motor piston slidably mounted in the chamber, a cluster of fuel and oxidizer tanks mounted laterally of each other on the frame member with cylindrical interiors, fuel and oxidizer pistons slidably mounted in said tanks for being forced axially forwardly to forcibly eject fuel and oxidizer from the tanks, means rigidly connecting said fuel and oxidizer pistons to said motor piston, conduit means leading from said tanks to said thrust chamber, and an adjustable stop adjustable in position with respect to said frame member for limiting the forward movement of said pistons so that the travel of the fuel and oxidizer pistons is limited to the same distance and for the same time duration of travel.

References Cited in the file of this patent

UNITED STATES PATENTS

| | | |
|---|---|---|
| 2,700,337 | Cumming | Jan. 25, 1955 |
| 2,753,801 | Cumming | July 10, 1956 |
| 2,814,252 | Volk | Nov. 26, 1957 |
| 2,868,127 | Fox | Jan. 13, 1959 |
| 2,984,973 | Stegelman | May 23, 1961 |

OTHER REFERENCES

Rocket Propulsion Elements by Sutton, published by John Wiley & Sons, 1956 (pp. 245 and 246 relied on).